(12) United States Patent
Blanz et al.

(10) Patent No.: US 8,363,624 B2
(45) Date of Patent: Jan. 29, 2013

(54) METHOD AND APPARATUS FOR SENDING SIGNALING INFORMATION VIA CHANNEL IDS

(75) Inventors: Josef J. Blanz, Wachenheim (DE); Ivan Jesus Fernandez-Corbaton, Nuremberg (DE)

(73) Assignee: Qualcomm Incorporated, San Diego, CA (US)

( * ) Notice: Subject to any disclaimer, the term of this patent is extended or adjusted under 35 U.S.C. 154(b) by 677 days.

(21) Appl. No.: 11/677,431

(22) Filed: Feb. 21, 2007

(65) Prior Publication Data

US 2007/0195809 A1 Aug. 23, 2007

Related U.S. Application Data

(60) Provisional application No. 60/775,898, filed on Feb. 22, 2006.

(51) Int. Cl.
*H04J 3/24* (2006.01)
*H04J 3/12* (2006.01)
*H04W 4/00* (2009.01)
*H04B 7/00* (2006.01)

(52) U.S. Cl. ........ 370/335; 370/338; 370/341; 370/349; 370/522; 455/68; 455/522

(58) Field of Classification Search .................. 370/341
See application file for complete search history.

(56) References Cited

U.S. PATENT DOCUMENTS

| | | | |
|---|---|---|---|
| 2003/0147371 A1* | 8/2003 | Choi et al. | 370/341 |
| 2003/0189918 A1* | 10/2003 | Das et al. | 370/349 |
| 2004/0180687 A1* | 9/2004 | Ahn et al. | 455/522 |
| 2005/0250506 A1 | 11/2005 | Beale et al. | |
| 2005/0265281 A1 | 12/2005 | Ketchum | |
| 2006/0002414 A1 | 1/2006 | Du et al. | |
| 2009/0180416 A1* | 7/2009 | Schmidl et al. | 370/311 |

FOREIGN PATENT DOCUMENTS

| | | |
|---|---|---|
| EP | 1638271 A1 | 3/2006 |
| JP | 9009323 A | 1/1997 |

(Continued)

OTHER PUBLICATIONS

International Search Report and Written Opinion—PCT/US2007/062512, International Search Authority—European Patent Office -Jan. 8, 2007.
Taiwan Search Report—TW096106552—TIPO—Mar. 23, 2011.

(Continued)

*Primary Examiner* — Charles Appiah
*Assistant Examiner* — Natasha Cosme
(74) *Attorney, Agent, or Firm* — S. Hossain Beladi

(57) ABSTRACT

Techniques for sending signaling information are described. Multiple signaling channels may be available to send signaling information. Different signaling information, different signaling parameter values, or different interpretations of signaling parameter values may be associated with different signaling channels and conveyed by the selection of these signaling channels, which may be used for actual transmission of remaining signaling information. A transmitter selects at least one signaling channel from among the multiple signaling channels based on first signaling information and sends second signaling information on the selected signaling channel(s) to convey the first and second signaling information. The transmitter sends at least one data stream on at least one data channel in accordance with the first and second signaling information. A receiver obtains the first signaling information based on the selected signaling channel(s) and decodes the selected signaling channel(s) to obtain the second signaling information. The receiver processes the data channel(s) in accordance with the first and second signaling information to recover the data stream(s).

54 Claims, 8 Drawing Sheets

FOREIGN PATENT DOCUMENTS

| | | |
|---|---|---|
| RU | 2159018 C2 | 11/2000 |
| WO | WO9620572 A1 | 7/1996 |
| WO | WO2005046125 A1 | 5/2005 |
| WO | 2005099123 A | 10/2005 |
| WO | 2005107304 A | 11/2005 |

OTHER PUBLICATIONS

Zhang, J. et al., "Linear transmitter precoding design for down link of multi user MIMO systems", Electronics Letters, vol. 41, Issue: 14, Jul. 7, 2005.

* cited by examiner

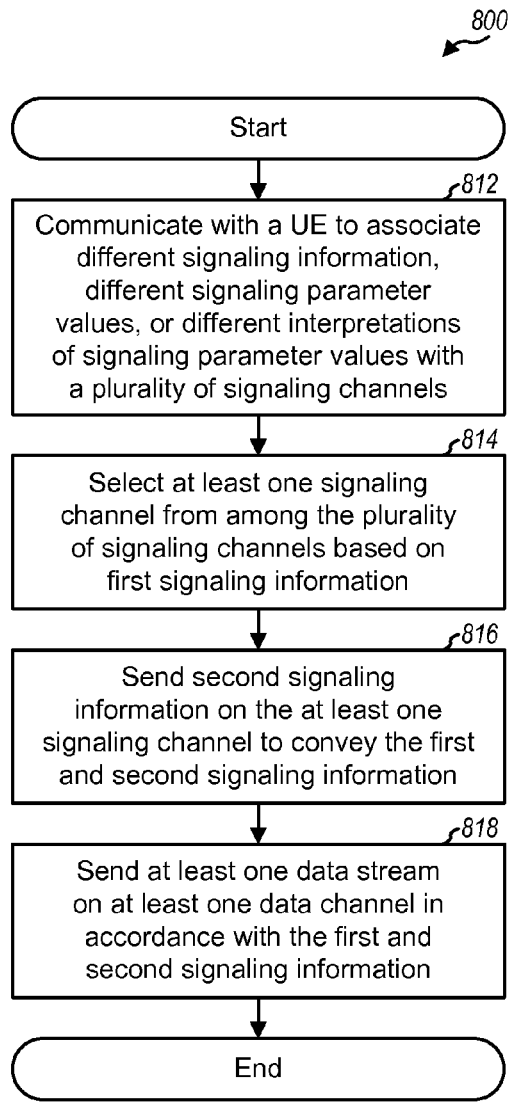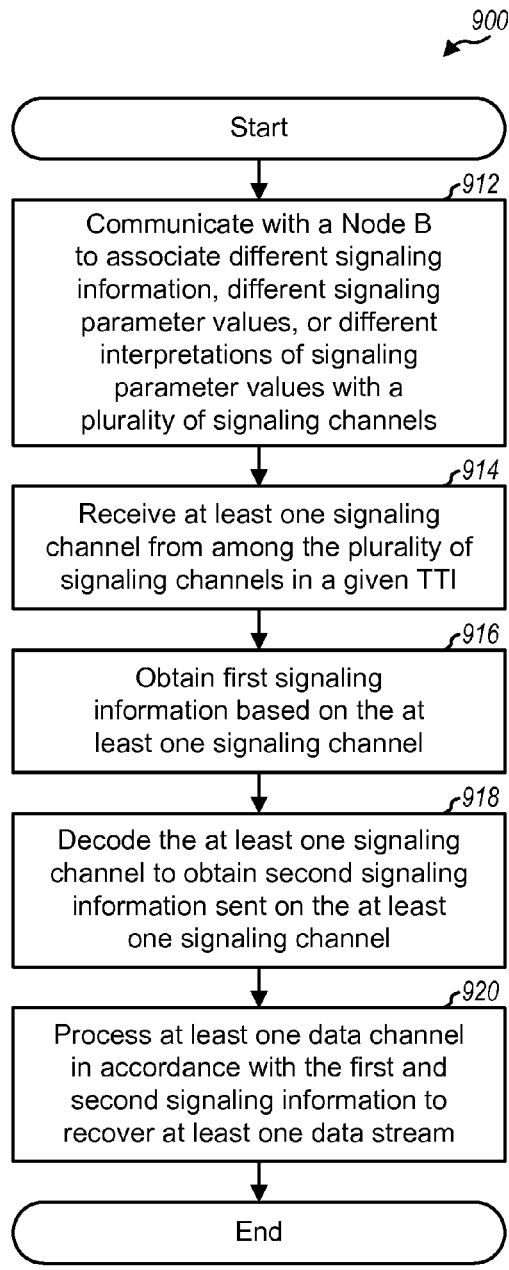
FIG. 8
FIG. 9

METHOD AND APPARATUS FOR SENDING SIGNALING INFORMATION VIA CHANNEL IDS

CLAIM OF PRIORITY UNDER 35 U.S.C. §119

The present application for patent claims priority to Provisional Application Ser. No. 60/775,898, entitled "Signaling Transport Format and Resource Allocation per Data Stream in MIMO Systems," filed Feb. 22, 2006, assigned to the assignee hereof, and expressly incorporated herein by reference.

BACKGROUND

I. Field

The present disclosure relates generally to communication, and more specifically to techniques for sending signaling information in a wireless communication system.

II. Background

A wireless multiple-access communication system can support communication for multiple terminals on the downlink and uplink. The downlink (or forward link) refers to the communication link from the base stations to the terminals, and the uplink (or reverse link) refers to the communication link from the terminals to the base stations. Multiple terminals may simultaneously receive data and signaling on the downlink and/or transmit data and signaling on the uplink. This may be achieved by multiplexing the transmissions on each link to be orthogonal to one another and/or by controlling the transmit power of each transmission to achieve a desired received signal quality.

A multiple-access system typically allocates some system resources for sending signaling information on the downlink to the terminals. The signaling information may be for various parameters used to support data transmission, such as resource assignment, coding and modulation scheme, etc. The amount of signaling information to send may be dependent on various factors such as the manner in which system resources are assigned, the number of parameters to send, the desired flexibility in sending the parameters, etc. Signaling messages may be generated for all defined parameters and sent using the system resources allocated for sending signaling information.

It is desirable to send signaling information as efficiently as possible since this information represents overhead. It is desirable to send a given amount of signaling information using as little system resources as possible or to send more signaling information for a given amount of system resources.

SUMMARY

Techniques for efficiently sending signaling information are described herein. A plurality of signaling channels may be available to send signaling information. These signaling channels may correspond to different channelization codes, different time slots, different sets of subcarriers, etc. Different signaling information, different signaling parameter values, or different interpretations of signaling parameter values may be associated with different signaling channels. Some signaling information may then be conveyed via selection of one or more signaling channels from among the plurality of signaling channels. Remaining signaling information may be sent on the selected signaling channel(s).

According to an aspect, an apparatus is described which selects at least one signaling channel from among a plurality of signaling channels based on first signaling information and sends second signaling information on the at least one selected signaling channel to convey the first and second signaling information. The apparatus may send at least one data stream on at least one data channel in accordance with the first and second signaling information. The first and second signaling information may comprise various types of signaling information, as described below.

According to another aspect, an apparatus is described which receives at least one signaling channel from among a plurality of signaling channels, obtains first signaling information based on the at least one signaling channel, and decodes the at least one signaling channel to obtain second signaling information. The apparatus may further process at least one data channel in accordance with the first and second signaling information to recover at least one data stream.

Various aspects and features of the disclosure are described in further detail below.

BRIEF DESCRIPTION OF THE DRAWINGS

FIG. 8 shows a process for sending signaling and data.

FIG. 9 shows a process for receiving signaling and data.

DETAILED DESCRIPTION

Figure 1:
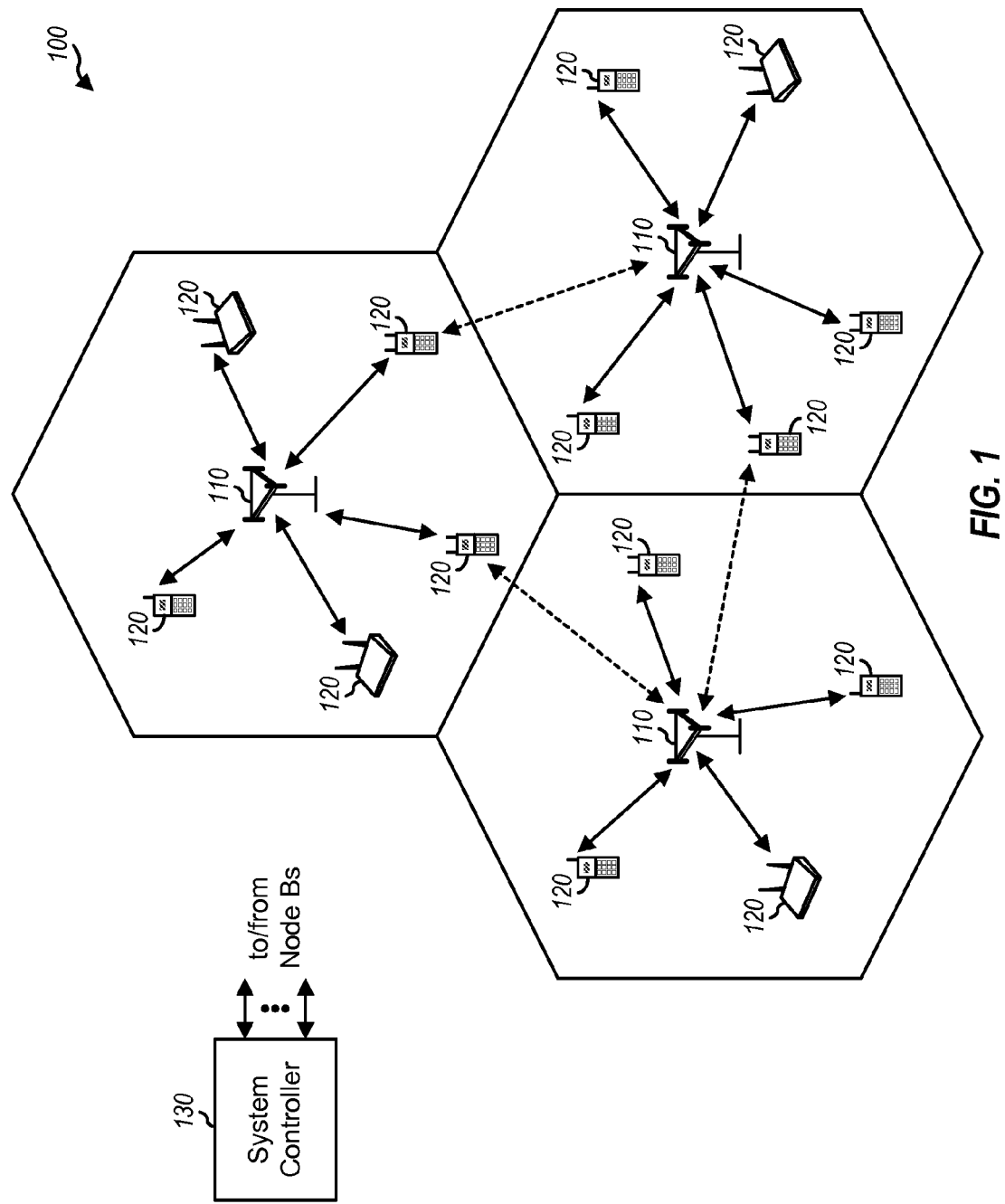
FIG. 1 shows a wireless communication system.

FIG. 1 shows a wireless communication system 100 with multiple Node Bs 110 and UEs 120. A Node B is generally a fixed station that communicates with the UEs and may also be referred to as an enhanced Node B, a base station, an access point, etc. Each Node B 110 provides communication coverage for a particular geographic area and supports communication for the UEs located within the coverage area. A system controller 130 couples to Node Bs 110 and provides coordination and control for these Node Bs. System controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, etc.

Figure 2:
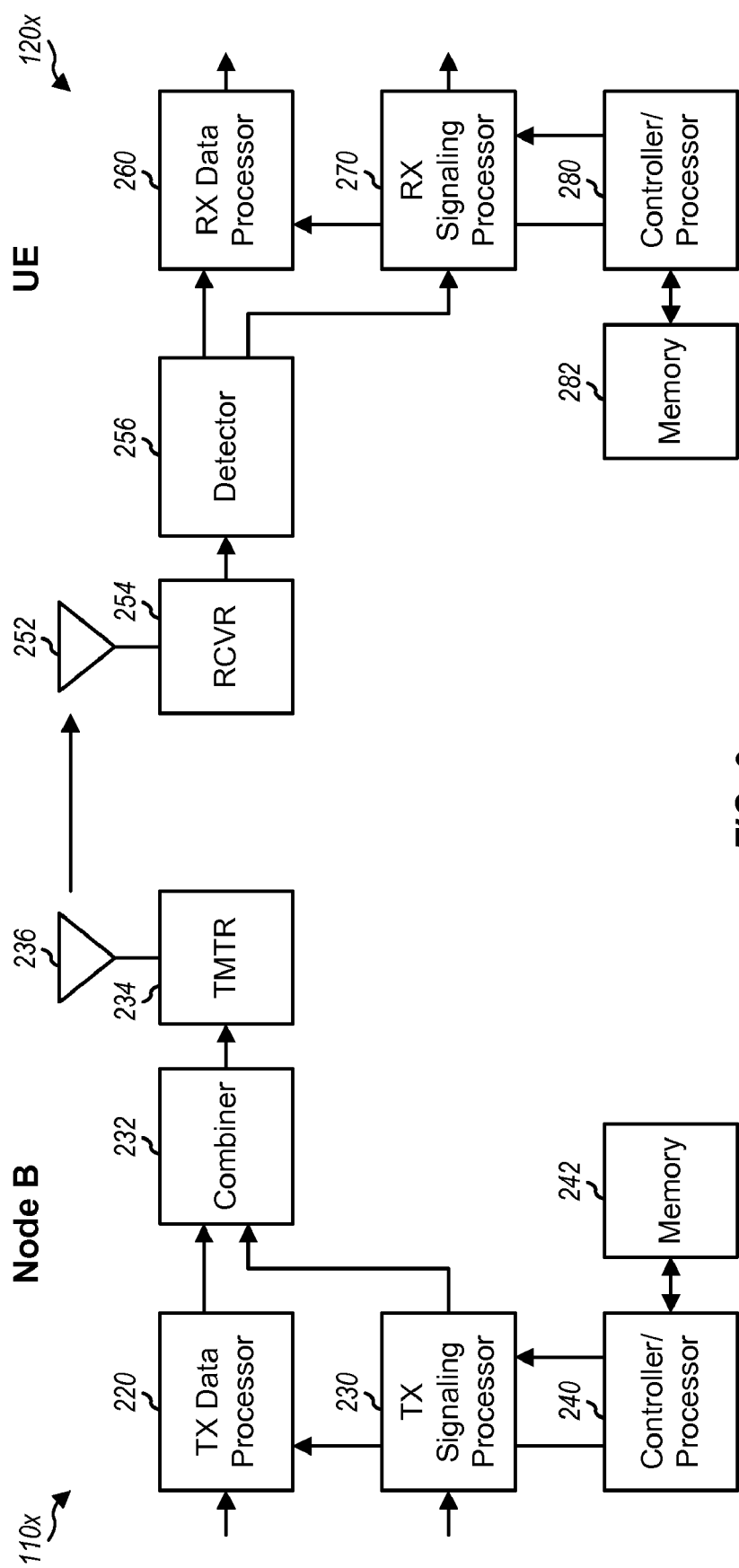
FIG. 2 shows a block diagram of a Node B and a user equipment (UE).

FIG. 2 shows a block diagram of a design of a Node B 110x and a UE 120x, which may be one of the Node Bs and UEs in FIG. 1. Node B 110x may be equipped with one transmit antenna, as shown in FIG. 2. UE 120x may be equipped with one receive antenna (as shown in FIG. 2) or multiple receive antennas (not shown in FIG. 2). For simplicity, only processing units for transmission on the downlink from one transmit antenna to one receive antenna are shown in FIG. 2.

At Node B 110x, a TX data processor 220 receives data for all UEs scheduled for downlink transmission, processes the data for each UE as described below, and provides data chips. A TX signaling processor 230 receives signaling information for all UEs, processes the signaling information for each UE as described below, and provides signaling chips. A combiner 232 combines the data chips from processor 220 and the signaling chips from processor 230 and provides output chips. The combining may be dependent on the multiplexing scheme used for data and signaling, e.g., code division multiplexing (CDM), time division multiplexing (TDM), frequency division multiplexing (FDM), etc. Processor 220 and/or combiner 232 may also multiplex pilot with the data and signaling chips. A transmitter (TMTR) 234 processes (e.g., converts to analog, amplifies, filters, and frequency upconverts) the output chips and generates a downlink signal, which is transmitted via an antenna 236.

At UE 120x, an antenna 252 (or possibly multiple antennas) receives the downlink signal from Node B 110x and provides a received signal to a receiver (RCVR) 254. Receiver 254 processes (e.g., filters, amplifies, frequency downconverts, and digitizes) the received signal and provides samples. A detector 256 processes the samples to obtain received symbols, provides received data symbols to a receive (RX) data processor 260, and provides received signaling symbols to an RX signaling processor 270. Detector 256 may be an equalizer, a Rake receiver, etc. RX data processor 260 processes the received data symbols in a manner complementary to the processing by TX data processor 220 and provides decoded data for UE 120x. RX signaling processor 270 processes the received signaling symbols in a manner complementary to the processing by TX signaling processor 230 and provides signaling information for UE 120x.

Controllers 240 and 280 direct the operation at Node B 110x and UE 120x, respectively. Memories 242 and 282 store program codes and data for Node B 110x and UE 120x, respectively.

Figure 3:
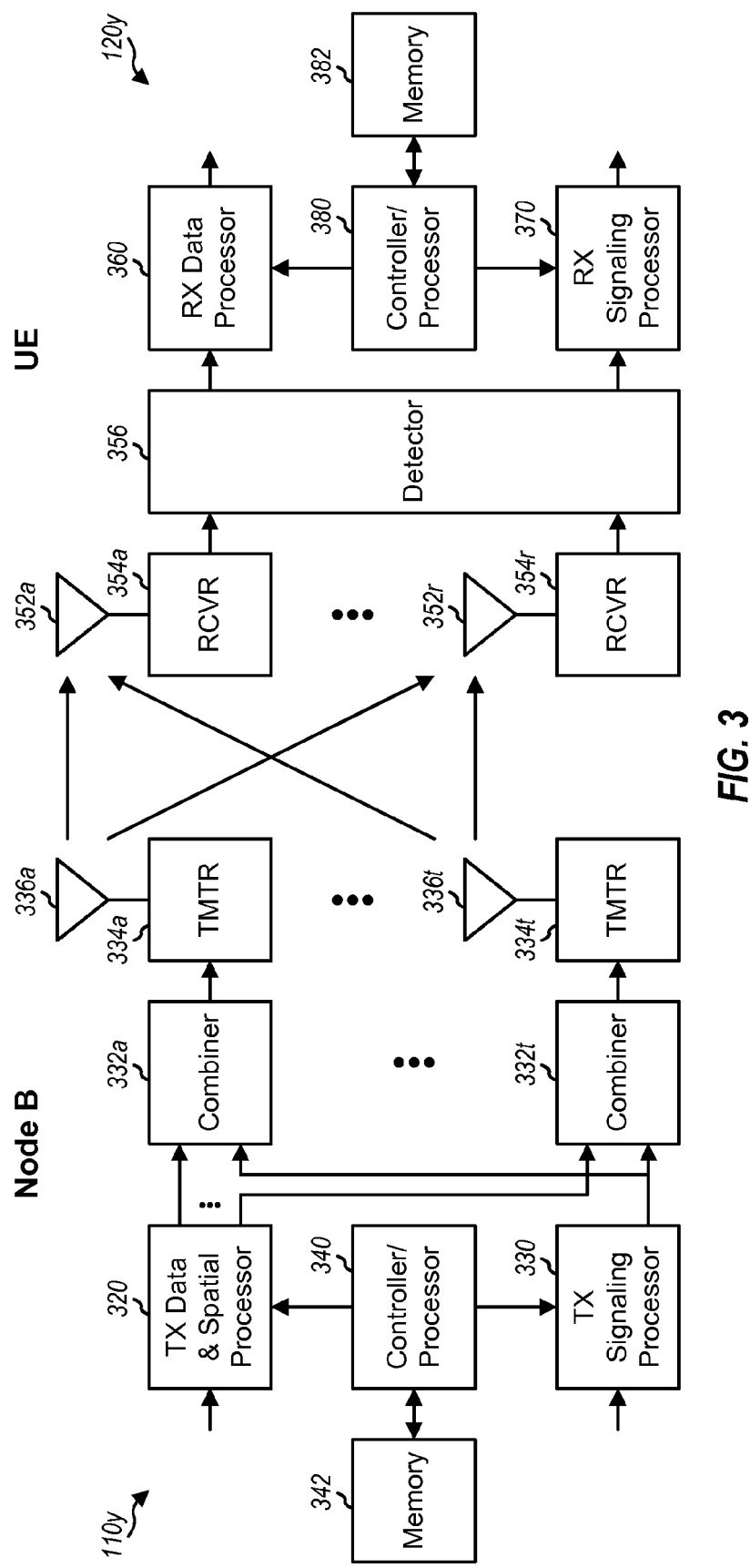
FIG. 3 shows a block diagram of a Node B and a UE for MIMO.

FIG. 3 shows a block diagram of a design of a Node B 110y and a UE 120y, which may also be one of the Node Bs and UEs in FIG. 1. Node B 110y is equipped with multiple (T) antennas 336a through 336t that may be used for data transmission on the downlink and data reception on the uplink. UE 120y is equipped with multiple (R) antennas 352a through 352r that may be used for data transmission on the uplink and data reception on the downlink. Each antenna may be a physical antenna, a virtual antenna comprising an antenna array and an appropriate beamforming device, an antenna array with a fixed weighting network, etc. A multiple-input multiple-output (MIMO) transmission may be sent from the T transmit antennas at Node B 110y to the R receive antennas at UE 120y.

At Node B 110y, a TX data and spatial processor 320 receives data for all scheduled UEs, processes the data for each UE, performs spatial mapping, and provides data chips to T combiners 332a through 332t. A TX signaling processor 330 receives signaling information for all UEs, processes the signaling information for each UE, and provides signaling chips to combiners 332a through 332t. Each combiner 332 combines the data chips from processor 320 and the signaling chips from processor 330 and provides output chips to an associated transmitter 334. Each transmitter 334 processes its output chips and generates a downlink signal. T downlink signals from T transmitters 334a through 334t are sent via T antennas 336a through 336t, respectively.

At UE 120y, R antennas 352a through 352t receive the downlink signals from Node B 110y and provide R received signals to R receivers 354a through 354r, respectively. Each receiver 354 processes its received signal and provides samples. A detector 356 processes the samples from all R receivers 354 to obtain received symbols, provides received data symbols to an RX data processor 360, and provides received signaling symbols to an RX signaling processor 370. Detector 356 may be an equalizer, a MIMO detector, etc. RX data processor 360 processes the received data symbols and provides decoded data for UE 120y. RX signaling processor 270 processes the received signaling symbols and provides signaling information for UE 120y.

Controllers 340 and 380 direct the operation at Node B 110y and UE 120y, respectively. Memories 342 and 382 store program codes and data for Node B 110y and UE 120y, respectively.

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The terms "systems" and "networks" are often used interchangeably. A CDMA system may implement a radio technology such cdma2000, Universal Terrestrial Radio Access (UTRA), Evolved UTRA (E-UTRA), etc. cdma2000 covers IS-2000, IS-95 and IS-856 standards. UTRA and E-UTRA are part of Universal Mobile Telecommunication System (UMTS). UTRA includes Wideband-CDMA (W-CDMA, UMTS-FDD) and Time Division Synchronous CDMA (TD-SCDMA) (UMTS-TDD, low chip rate UMTS-TDD, high chip rate UMTS-TDD). A TDMA system may implement a radio technology such as Global System for Mobile Communications (GSM). An OFDMA system may implement a radio technology such as Long Term Evolution (LTE) (which is part of E-UTRA), IEEE 802.20, Flash-OFDM®, etc. UTRA, E-UTRA, UMTS, and GSM are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for UMTS, and 3GPP terminology is used in much of the description below.

In UMTS, data for a UE is processed as one or more transport channels at a higher layer. The transport channels may carry data for one or more services, e.g., voice, video, packet data, etc. The transport channels are mapped to physical channels at a physical layer. The physical channels are channelized with different channelization codes and are orthogonal to one another in the code domain.

3GPP Release 5 and later supports High-Speed Downlink Packet Access (HSDPA), which is a set of channels and procedures that enable high-speed packet data transmission on the downlink. For HSDPA, a Node B sends data on a High Speed Downlink Shared Channel (HS-DSCH), which is a downlink transport channel that is shared by all UEs in both time and code. The HS-DSCH may carry data for one or more UEs in each transmission time interval (TTI). For HSDPA, a 10 millisecond (ms) frame is partitioned into five 2-ms subframes, each subframe covers three time slots, and each time slot has a duration of 0.667 ms. A TTI is equal to one subframe for HSDPA and is the smallest unit of time in which a UE may be scheduled and served. The sharing of the HS-DSCH is dynamic and may change from TTI to TTI.

Table 1 lists some downlink and uplink physical channels used for HSDPA and provides a short description for each physical channel.

TABLE 1

| Link | Channel | Channel Name | Description |
| --- | --- | --- | --- |
| Downlink | HS-PDSCH | High Speed Physical Downlink Shared Channel | Carry data sent on the HS-DSCH for different UEs. |
| Downlink | HS-SCCH | Shared Control Channel for HS-DSCH | Carry signaling for the HS-PDSCH. |
| Uplink | HS-DPCCH | Dedicated Physical Control Channel for HS-DSCH | Carry feedback for downlink transmission in HSDPA. |

For HSDPA, a Node B may use up to fifteen 16-chip channelization codes with spreading factor of 16 (SF=16) for the HS-PDSCH. The Node B may also use any number of 128-chip channelization codes with spreading factor of 128 (SF=128) for the HS-SCCH. The number of 16-chip channelization codes for the HS-PDSCH and the number of 128-chip channelization codes for the HS-SCCH are configurable. The channelization codes for the HS-PDSCH and HS-SCCH are orthogonal variable spreading factor (OVSF) codes that may be generated in a structured manner based on an OVSF code tree. The spreading factor (SF) is the length of a channelization code. A symbol is spread with a channelization code of length SF to generate SF chips for the symbol. A Node B may reuse all of the available channelization codes for each transmit antenna.

A UE may be assigned up to fifteen 16-chip channelization codes for data transmission on the HS-PDSCH and, according to the current specification of HSDPA, up to four 128-chip channelization codes for monitoring signaling information on the HS-SCCH. The 128-chip channelization codes for the HS-SCCH are assigned to the UE at call setup and signaled to the UE via upper layer signaling. The 16-chip channelization codes for the HS-PDSCH are assigned dynamically and conveyed to the UE via signaling sent on the HS-SCCH using one of the 128-chip channelization codes assigned to the UE.

In the following description, HSDPA is considered as having (a) up to fifteen HS-PDSCHs, with each HS-PDSCH corresponding to a different 16-chip channelization code, and (b) any number of HS-SCCHs, with each HS-SCCH corresponding to a different 128-chip channelization code. A UE may be assigned up to four HS-SCCHs for monitoring and up to fifteen HS-PDSCHs in a given TTI. The HS-SCCHs assigned to the UE may be associated with channel identifiers (IDs). For example, the HS-SCCH with the lowest channelization code index (or simply, code index) may be given channel ID of 1, the HS-SCCH with the second lowest code index may be given channel ID of 2, the HS-SCCH with the third lowest code index may be given channel ID of 3, and the HS-SCCH with the highest code index may be given channel ID of 4. The channel IDs for the assigned HS-SCCHs may also be defined in other manners such that there is a one-to-one mapping between HS-SCCHs and channel IDs. Certain signaling information may be conveyed via the channel IDs, as described below.

HSDPA supports hybrid automatic retransmission (HARQ), which is also referred to as incremental redundancy (IR). With HARQ, a Node B sends a transmission for a transport block and may send one or more retransmissions until the transport block is decoded correctly by a UE, or the maximum number of retransmissions has been sent, or some other termination condition is encountered. A transport block may also be referred to as a data block, a packet, etc. A Node B may thus send a variable number of transmissions for a transport block with HARQ.

Figure 4:
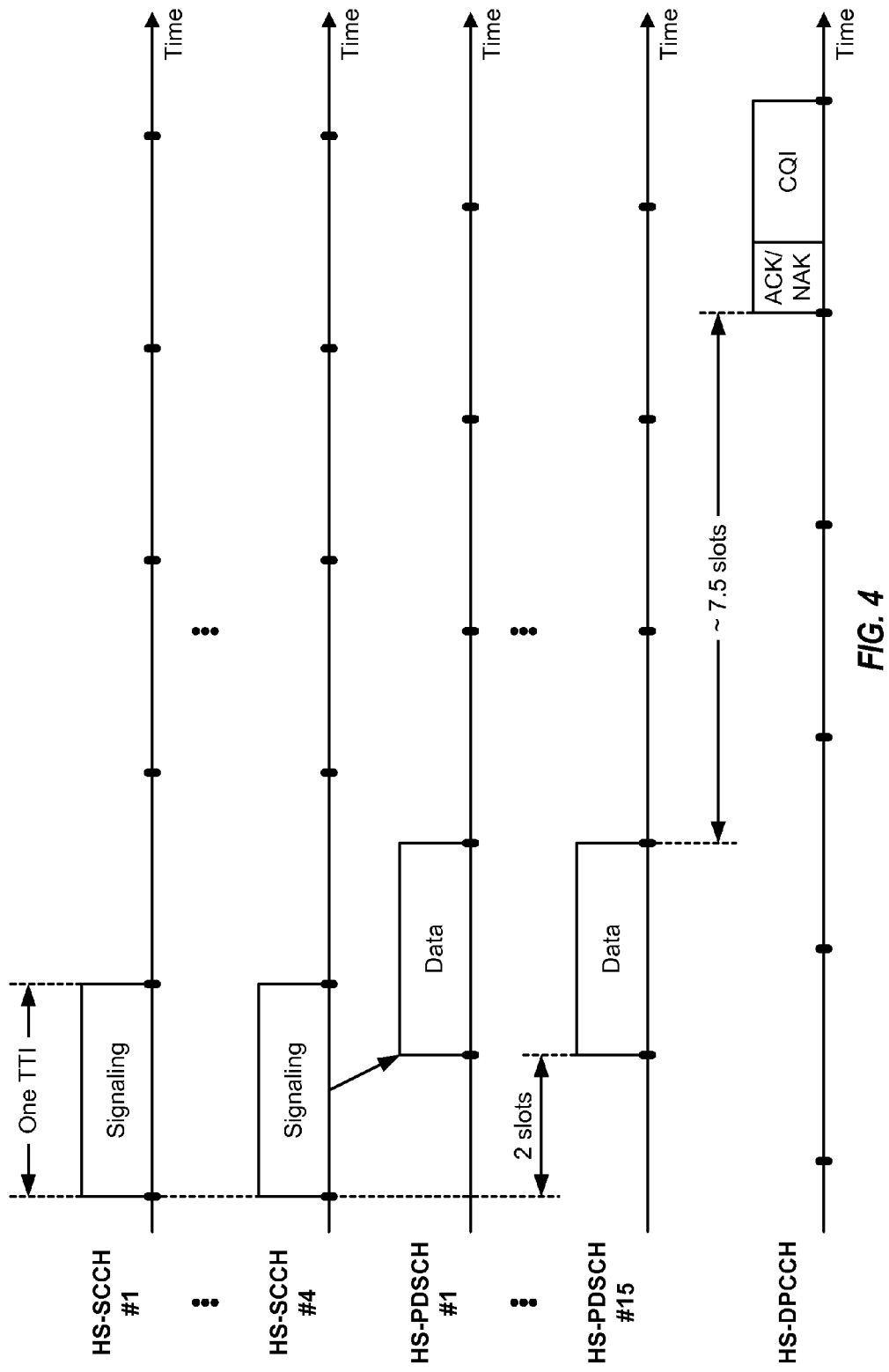
FIG. 4 shows transmissions for High-Speed Downlink Packet Access (HSDPA).

FIG. 4 shows example transmissions for HSDPA. A Node B may serve one or more UEs in each TTI. The Node B sends signaling for each scheduled UE on the HS-SCCHs and sends data on the HS-PDSCHs two slots later. Each UE that might receive data on the HS-PDSCHs processes its assigned HS-SCCHs in each TTI to determine whether signaling has been sent for that UE. Each UE that is scheduled in a given TTI may process the HS-PDSCHs to recover data sent for that UE, send an acknowledgement (ACK) on the HS-DPCCH if a transport block is decoded correctly, and send a negative acknowledgement (NAK) on HS-DPCCH otherwise. Each UE may also estimate signal-to-noise-and-interference ratio (SINR), determine a channel quality indicator (CQI) based on the SINR estimate, and send the CQI along with the ACK/NAK on the HS-DPCCH approximately 7.5 slots from the end of the corresponding transmission on the HS-PDSCHs.

Figure 5:
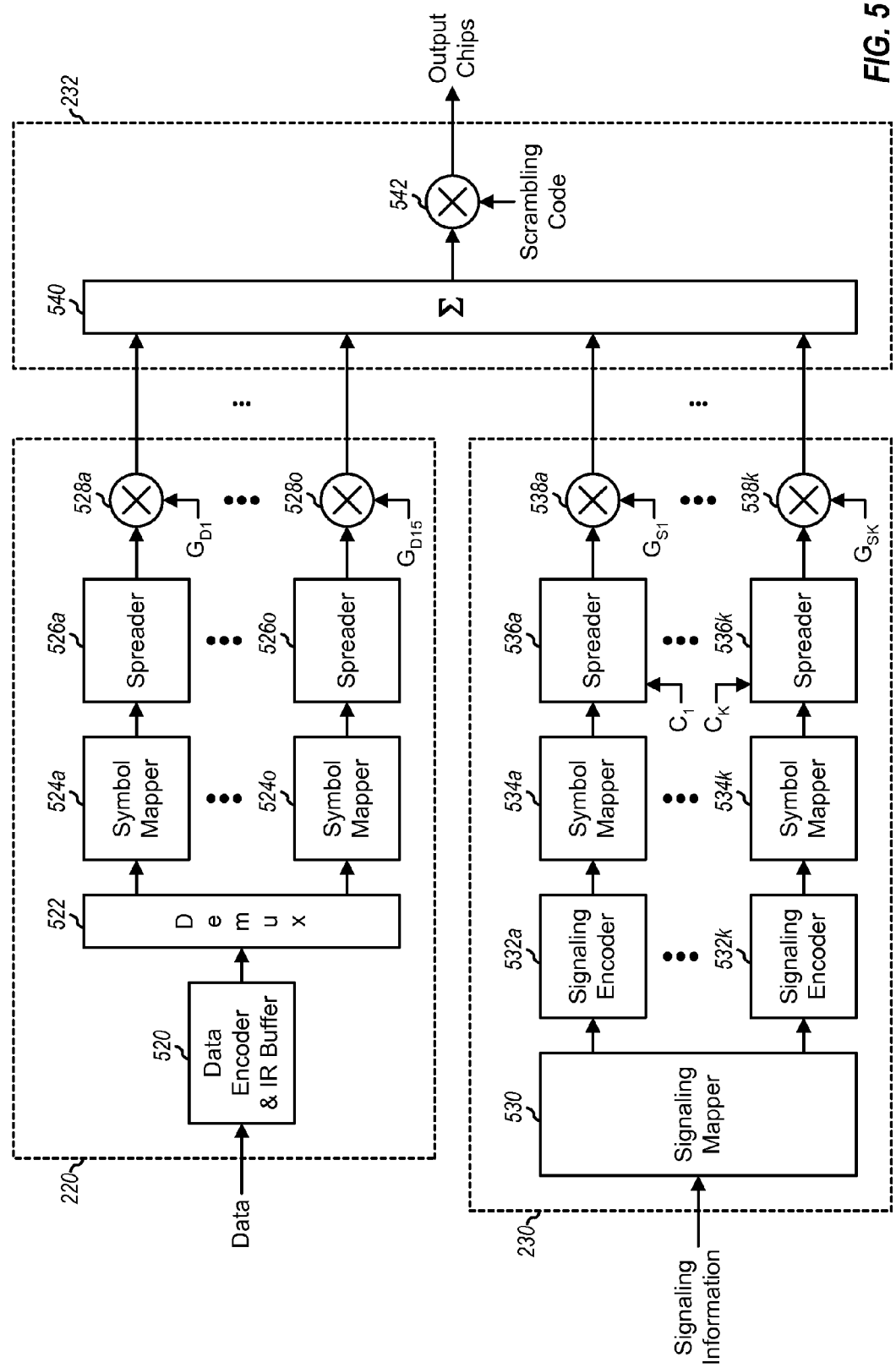
FIG. 5 shows a block diagram of a transmit (TX) data processor, a TX signaling processor, and a combiner at the Node B in FIG. 2.

FIG. 5 shows a block diagram of a design of TX data processor 220, TX signaling processor 230, and combiner 232 at Node B 110x in FIG. 2. For clarity, the processing to send data and signaling to one UE is described below.

Within TX data processor 220, a data encoder 520 receives data to send to the UE, partitions the data into transport blocks, and encodes each transport block based on a coding scheme to obtain a coded block. Encoder 520 further partitions each coded block into multiple redundancy versions and stores these redundancy versions in an IR buffer. Each redundancy version may contain different encoded information (or code bits) in a coded block. Encoder 520 provides one redundancy version of a coded block for each transmission of a corresponding transport block. A demultiplexer (Demux) 522 receives the redundancy version from encoder 520, demultiplexes the code bits in the received redundancy version, and provides code bits to up to fifteen symbol mappers 524a through 524o for up to fifteen HS-PDSCHs used for transmission. Each symbol mapper 524 interleaves (or reorders) its code bits and further maps the interleaved bits to data symbols based on a modulation scheme. Symbol mappers 524a through 524o provide data symbols to spreaders 526a through 526o, respectively. Each spreader 526 spreads its data symbols with a 16-chip channelization code assigned to that spreader. Multipliers 528a through 528o multiply the outputs of spreaders 526a through 526o with gains $G_{D1}$ through $G_{D15}$, respectively, and provides data chips for the fifteen HS-PDSCHs. Gains $G_{D1}$ through $G_{D15}$ determine the amount of transmit power to use for the fifteen HS-PDSCHs, and each gain may be set to zero to disable the associated HS-PDSCH. A transport block size may be selected based on the number of HS-PDSCHs to use for transmission, and the processing by encoder 520 may be performed based on the selected transport block size.

Within TX signaling processor 230, a signaling mapper 530 receives signaling information to send to the UE in each TTI and, based on the received signaling information, selects one or more specific HS-SCCHs from among K HS-SCCHs assigned to the UE, where $1 \leq K \leq 4$ for 3GPP Release 5 of UMTS but may be higher in later releases. In 3GPP Release 5 of UMTS, the HS-SCCH carries the following information on a transmitted data block: a modulation scheme (MS) (QPSK or 16-QAM are possible in Release 5), a channelization code set (CCS) that indicates which one(s) of the 15 possible 16-chip channelization codes are used for the transport block, a transport block size (TBS), an HARQ process ID (HID), a redundancy version (RV), a new data indicator (ND) that indicates whether a new transport block or a repetition is transmitted, and a UE ID of the UE for which the data block is sent. In later Releases, more information may be transmitted on HS-SCCH to support new features such as 64-QAM modulation, MIMO, etc. Various types of signaling information may be conveyed via the channel ID of each selected HS-SCCH, as described below. This may then reduce the amount of signaling information to send on the selected HS-SCCH(s). Mapper 530 provides the signaling information to one or more of K signaling encoders 532a through 532k for the one or more HS-SCCHs selected based on the received signaling information. Each encoder 532 encodes the signaling information based on a coding scheme and provides a corresponding codeword to an associated symbol mapper 534. Symbol mapper 534 maps the code bits in the codeword to signaling symbols (e.g., based on QPSK) and provides the signaling symbols to an associated spreader 536. Spreader 536 spreads the signaling symbols based on a 128-chip channelization code $C_k$ assigned to that spreader. Multipliers 538a through 538k multiply the outputs of spreaders 536a through 536k with gains $G_{S1}$ through $G_{SK}$, respectively, and provide signaling chips for the K HS-SCCHs. Gains $G_{S1}$ through $G_{SK}$ determine the amount of transmit power to use for the K HS-SCCHs, and each gain may be set to zero to disable the associated HS-SCCH. For example, the gain for each selected HS-SCCH may be set to a non-zero value, and the gain for each unselected HS-SCCH may be set to zero.

Within combiner 232, a summer 540 sums the data chips from multipliers 528a through 528o in TX data processor 220 and the signaling chips from multipliers 538a through 538k in TX signaling processor 230. A multiplier 542 multiplies the output of summer 540 with a scrambling code for the Node B and provides output chips to transmitter 234.

Figure 6:
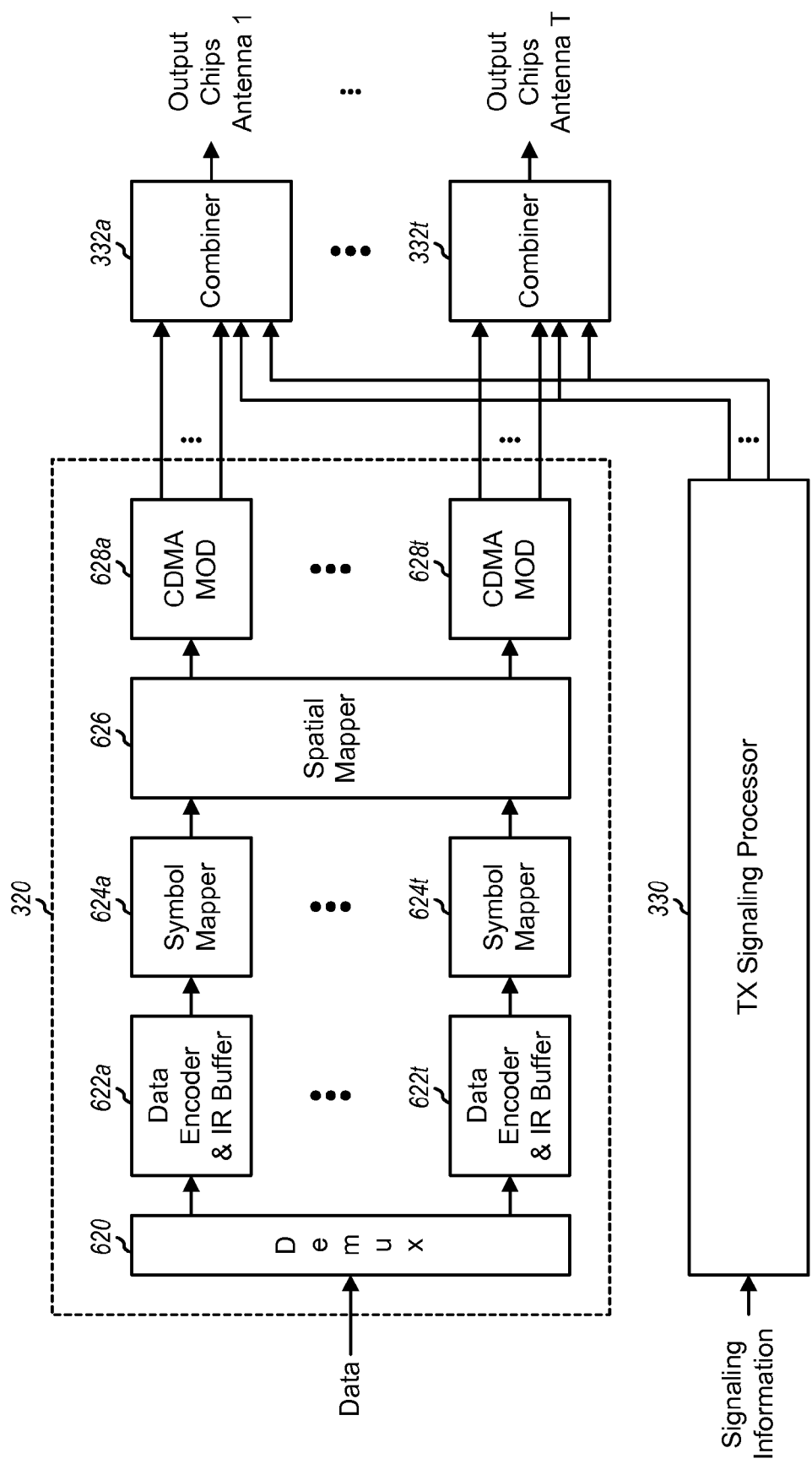
FIG. 6 shows a block diagram of a TX data and spatial processor, a TX signaling processor, and a combiner at the Node B in FIG. 3.

FIG. 6 shows a block diagram of a design of TX data and spatial processor 320 at Node B 110y in FIG. 3. For clarity, the processing to send data to one UE is described below. In general, S data streams may be sent in parallel from T transmit antennas to R receive antennas, where $S \leq \min\{T, R\}$. Within TX data and spatial processor 320, a demultiplexer 620 receives data to send to the UE, demultiplexes the data into up to T data streams, and provides the data streams to up to T data encoders 622a through 622t. In general, any number of data streams up to min {T, R} may be sent to the UE, and the number of data streams to send may be selected based on channel conditions and/or other factors. Each encoder 622 partitions its data stream into transport blocks and encodes each transport block based on a coding scheme to obtain a coded block. Each encoder 622 further partitions each coded block into multiple redundancy versions and stores these redundancy versions in an associated IR buffer. When directed (e.g., by controller 340), each encoder 622 provides a selected redundancy version for a coded block to an associated symbol mapper 624. Symbol mapper 624 interleaves the code bits in the selected redundancy version and maps the interleaved bits to data symbols based on a modulation scheme.

A spatial mapper 626 receives the data symbols from symbol mappers 624a through 624t and performs spatial mapping on the data symbols based on a spatial mapping scheme. The spatial mapping may be performed across all data streams for each HS-PDSCH used for transmission. The spatial mapping for each HS-PDSCH channelization code c in each symbol period s may be expressed as:

$$\underline{d}_c(s) = \underline{B}_c \underline{b}_c(s), \quad \text{Eq (1)}$$

where $\underline{b}_c(s)$ is a vector with up to T data symbols to send on channelization code c in symbol period s, $\underline{B}_c$ is a preceding weight matrix for channelization code c, and $\underline{d}_c(s)$ is a vector with up to T output symbols for up to T transmit antennas.

Various spatial mapping schemes may be supported such as space-time transmit diversity (STTD), closed loop transmit diversity (CLTD), per antenna rate control (PARC), code reuse Bell Labs layered space-time (CRBLAST), double-transmit adaptive array (D-TXAA), etc. For STTD, one data stream is sent from two transmit antennas, with each data symbol being sent from both antennas in two symbol periods to achieve time and spatial diversity. For CLTD, one data stream is sent from two transmit antennas, with the phase of one antenna being adjusted to improve reception by the UE. For CLTD, the preceding weight matrix $\underline{B}_c$ may be selected from a set of four 2×1 vectors $\{[1e^{j\pi/4}]^T, [1e^{-j3\pi/4}]^T, [1e^{j3\pi/4}]^T, [1e^{-j\pi/4}]^T\}$, where "T" denotes a transpose. For PARC, up to T data streams are sent from up to T transmit antennas, one data stream per antenna. For CRBLAST, one data stream is sent from up to T transmit antennas. For both PARC and CRBLAST, preceding weight matrix $\underline{B}_c$ may be equal to an identity matrix I containing ones along the diagonal and zeros elsewhere. For D-TXAA, one or two data streams are sent from two transmit antennas, with each data stream being sent on both antennas. For D-TXAA, precoding weight matrix $\underline{B}_c$ may be selected from a set of two 2×2 matrices $$\left\{ \begin{bmatrix} 1 & 1 \\ e^{j\pi/4} & e^{-j3\pi/4} \end{bmatrix}, \begin{bmatrix} 1 & 1 \\ e^{j3\pi/4} & e^{-j\pi/4} \end{bmatrix} \right\}$$

when two data streams are transmitted, or $\underline{B}_c$ may be selected from a set of four 2×1 vectors $\{[1e^{j\pi/4}]^T, [1e^{-j3\pi/4}]^T, [1e^{j3\pi/4}]^T, [1e^{-j\pi/4}]^T\}$ when only one data stream is transmitted. Other spatial mapping schemes may also be supported.

Spatial mapper 626 provides up to T streams of output symbols to up to T CDMA modulators (MODs) 628a through 628t. Each CDMA modulator 628 may include a demultiplexer, up to fifteen spreaders, and up to fifteen multipliers that may operate as described above for demultiplexer 522, spreaders 526a through 526o, and multipliers 528a through 528o in FIG. 5. Each CDMA modulator 628 demultiplexes its stream of output symbols into up to fifteen substreams for up to fifteen HS-PDSCHs, spreads the output symbols in each substream with a 16-chip channelization code for the associated HS-PDSCH, and multiplies the output of the spreading operation for each substream with a gain for the associated HS-PDSCH to obtain a data chip stream for that HS-PDSCH. Each CDMA modulator 628 provides up to fifteen data chip streams for up to fifteen HS-PDSCHs to an associated combiner 332.

TX signaling processor 330 may be implemented in the same manner as TX signaling processor 230 in FIG. 5. TX signaling processor 330 may map signaling information for the UE to one or more of the K HS-SCCHs assigned to the UE, process the signaling information for each HS-SCCH, and provide up to K signaling chip streams for up to K HS-SCCHs.

Each combiner 332 may include a summer and a multiplier that may operate as described above for summer 540 and multiplier 542 in FIG. 5. Each combiner 332 may sum the data chip streams received from the associated CDMA modulator 628 and the signaling chip streams received from TX signaling processor 330, multiply the summed chips with a scrambling code for the Node B, and provide output chips to an associated transmitter 334.

Node B 110x in FIG. 2 may send one data stream to a UE. Node B 110y in FIG. 3 may send one or more data streams to a UE. Various parameters may be selected for each data stream, e.g., based on feedback information received from the UE. For example, a modulation scheme, a transport block size, and a channelization code set may be selected for each data stream, e.g., based on CQI received from the UE. The modulation scheme may be QPSK, 16-QAM, etc. The transport block size may indicate the size of each transport block as well as a code rate to use for each transport block. The channelization code set may indicate one or more specific 16-chip channelization codes to use for a data stream. For each data stream, the selected transport block size may be provided to the data encoder for that stream, the selected modulation scheme may be provided to the symbol mapper(s) for that stream, and the selected channelization code set may be provided to the spreader(s) or CDMA modulator(s) for that stream.

S transmissions for S transport blocks may be sent in a given TTI for S data streams, where $1 \leq S \leq T$. The number of transport blocks sent in a TTI may be equal to the number of data streams sent in that TTI. A new transport block may be sent for a data stream whenever an ACK is received from the UE for a prior transport block. A redundancy version may also be selected for each transmission of a transport block. For each data stream, control information indicating whether or not to send a new transport block and which redundancy version to send for each transmission of a transport block may be provided to the data encoder for that stream.

Table 2 gives signaling information that may be sent on an HS-SCCH according to 3GPP Release 5 of UMTS for a transmission sent on the HS-PDSCHs. The first column of Table 2 lists signaling parameters, the second column gives the parameter size (in number of bits), and the third column gives a short description of each parameter. The signaling information carried on the HS-SCCH as described in Table 2 may change in later Releases.

TABLE 2

| Parameter | Size (bits) | Description |
| --- | --- | --- |
| Channelization code set | 7 | Indicate one of 120 possible channelization code sets for the HS-PDSCHs |
| Modulation scheme | 1 | Indicate QPSK or 16-QAM |
| Transport block size | 6 | Used to select one of 254 possible transport block sizes |
| HARQ process number | 3 | Indicate which transport block is being sent |
| Redundancy version | 3 | Indicate redundancy version and constellation rearrangement |
| New data indicator | 1 | Indicate whether the current transmission is a retransmission of a transport block |
| UE identity (UE ID) | 16 | Send with signaling on HS-SCCH to indicate the recipient UE |

In 3GPP Release 5 of UMTS, the transport block size (TBS) indicated by the 6-bit value in the TBS field is defined as a function of (i) the modulation scheme (e.g., QPSK or 16QAM in Release 5) indicated by the modulation scheme field and (ii) the number of channelization codes indicated by the channelization code set (CCS) field. For a given combination of modulation scheme and number of channelization codes, there are 63 possible values for the transport block size. A value of all ones in the TBS field is used to indicate that the transport block size is the one that was signaled in a previous transmission in case of retransmission.

Table 3 gives one design of signaling information that may be sent on one or more HS-SCCHs for one or two transmissions sent on the HS-PDSCHs with MIMO. The first column of Table 3 lists the signaling parameters, the second column gives the parameter size when one transport block is sent for one data stream, and the third and fourth columns give the parameter size when two transport blocks are sent for two data streams. The transport block size, redundancy version, and new data indicator are sent separately for primary and secondary transport blocks when two transport blocks are sent. Different and/or additional signaling information may also be sent on the HS-SCCH(s) in other designs.

TABLE 3

| Parameter | One Transport Block | Two Transport Blocks Primary | Secondary |
| --- | --- | --- | --- |
| Channelization code set | 7 | 7 | |
| Modulation scheme & secondary transport block information | 3 | 3 | |
| Transport block size | 6 | 6 | 6 |
| Precoding weight | 2 | 2 | |
| HARQ process number | 4 | 4 | |
| Redundancy version (RV) | 2 | 2 | 2 |
| New data indicator (ND) | (jointly encoded) | (jointly encoded) | (jointly encoded) |
| UE identity (UE ID) | 16 | 16 | |

In general, a Node B may send any signaling information for a transmission of a transport block to allow a UE to recover the transport block. For example, the signaling information may convey coding and modulation scheme, channelization codes, HARQ parameter, precoding weight, etc. The signaling information may be processed as a message or a scheduling information word (SIW), protected with a cyclic redundancy check (CRC) sum, scrambled with a UE ID of a recipient UE, and sent on one of the HS-SCCHs assigned to the UE. The UE may monitor its assigned HS-SCCHs. Upon being scheduled, the UE may decode a signaling message sent on one of the assigned HS-SCCHs and may then be able to decode the transmission sent on the HS-PDSCHs.

In general, a Node B may send one or multiple transmissions to a UE in a given TTI, where each transmission may be for a different transport block. The Node B may send sufficient signaling information for each transmission to allow the UE to decode that transmission. The signaling information for each transmission may be sent in a separate signaling message. Alternatively, the signaling information for multiple (e.g., all) transmissions in a TTI may be sent in a single signaling message.

In an aspect, to reduce signaling overhead, a Node B conveys some signaling information via the channel ID of each HS-SCCH used to send signaling information. The Node B sends remaining signaling information on the selected HS-SCCH(s). Various types of signaling information may be conveyed via the channel IDs, as described below.

In one design, multiple signaling messages are sent on multiple HS-SCCHs for multiple transmissions sent on the HS-PDSCHs in a given TTI, and the channel IDs of the HS-SCCHs convey which signaling message applies to each transmission. For example, a Node B may send two data streams simultaneously from two or more transmit antennas to a UE. In each TTI in which the UE is scheduled, the Node B may send two signaling messages for two transmissions of two transport blocks in two data streams. Each signaling message may include the parameters in Table 2 and/or other parameters. The Node B may send the two signaling messages on two HS-SCCHs. The channel IDs (or channelization code indices) of these two HS-SCCHs may be used to convey which signaling message applies to each data stream.

The identification of the signaling message for each data stream may be based on a predetermined mapping between channel IDs of the HS-SCCHs and data streams. For example, the predetermined mapping may be as follows:

The signaling message for the first data stream is sent on the HS-SCCH with the lowest code index among all HS-SCCHs assigned to the UE or all HS-SCCHs used to send signaling to the UE, The signaling message for the second data stream is sent on the HS-SCCH with the second lowest code index among all assigned or used HS-SCCHs, and The signaling message for each subsequent data stream is sent on the HS-SCCH with the next higher code index among all assigned or used HS-SCCHs.

The HS-SCCHs may be ordered in a predetermined manner (e.g., in ascending or descending order) based on their code indices. The predetermined mapping may be between assigned HS-SCCHs and data streams, e.g., the n-th assigned HS-SCCH may be used for the n-th data stream, where n=1, 2, . . . In this case, appropriate HS-SCCHs may be selected for use based on the data streams being sent. The predetermined mapping may also be between selected HS-SCCHs and data streams. In this case, any HS-SCCHs may be selected from among the assigned HS-SCCHs, and the n-th selected HS-SCCH may be used for the n-th data stream. The predetermined mapping between channel IDs and data streams may also be defined in other manners. In general, the predetermined mapping may be such that the signaling message for each data stream may be ascertained based on the channel ID of the HS-SCCH used to send that signaling message. Multiple signaling messages may thus be mapped to specific data streams without incurring additional overhead.

A UE may be able to ascertain the number of data streams being sent in a given TTI based on the number of signaling messages received in the TTI. In each TTI, the UE may ascertain that a single data stream is transmitted if only one signaling message is received on a single HS-SCCH, multiple data streams are transmitted if multiple signaling messages are received on multiple HS-SCCHs, or no data streams are transmitted if no signaling messages are received on any assigned HS-SCCHs. Dynamic switching between single and multiple data streams may be easily supported without incurring additional overhead.

As an example, a Node B may send two data streams with PARC under favorable channel conditions and may send a single data stream with STTD or CLTD under poor channel conditions. The channel conditions may be determined based on CQIs received from a UE. The Node B may dynamically switch between two-stream PARC and single-stream transmit diversity based on channel conditions. The Node B may send a single signaling message when transmitting a single data stream with transmit diversity and may send two signaling messages when transmitting two data streams with PARC. Each signaling message may convey pertinent information to decode the associated data stream.

Figure 7:
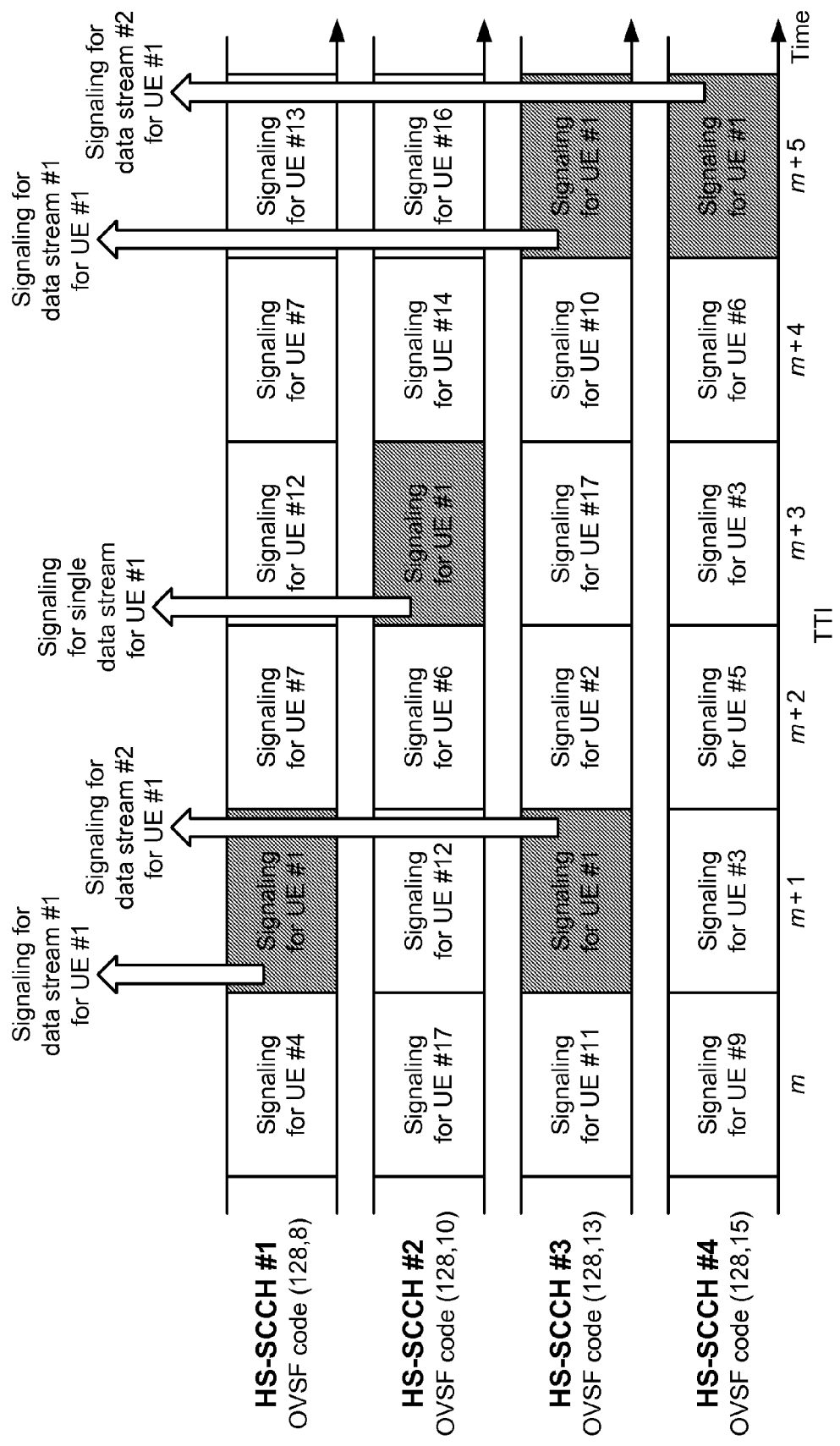
FIG. 7 shows transmission of signaling messages on four signaling channels.

FIG. 7 shows example transmissions of signaling messages on four HS-SCCHs #1 through #4 with a predetermined mapping between HS-SCCHs and data streams. A UE of interest (UE #1) monitors the four HS-SCCHs, which are assigned to the UE. In this example, HS-SCCHs #1, #2, #3 and #4 are sent using 128-chip channelization codes with indices of 8, 10, 13, and 15, respectively. In general, any code indices may be used for the HS-SCCHs. The channel IDs (e.g., #1, #2, #3 and #4) of the four HS-SCCHs may be determined based on the relative values of the code indices instead of the actual code indices.

UE #1 is not scheduled in TTI m, and no signaling messages are sent to UE #1 on any of the four HS-SCCHs. UE #1 is scheduled with two transmissions of two transport blocks for two data streams in TTI m+1. A signaling message for the first data stream is sent on HS-SCCH #1, and a signaling message for the second data stream is sent on HS-SCCH #3. The signaling message sent on HS-SCCH #1 in TTI m+1 may convey various parameters for the transmission sent in this TTI for the first data stream, which may be sent from antenna #1 with PARC. The signaling message sent on HS-SCCH #3 in TTI m+1 may convey various parameters for the transmission sent in this TTI for the second data stream, which may be sent from antenna #2.

UE #1 is not scheduled in TTI in m+2. UE #1 is scheduled with one transmission for one data stream in TTI m+3, and a single signaling message is sent to UE #1 on HS-SCCH #2. This signaling message may indicate that only one transmission is sent to UE #1 in TTI m+3 using a transmit diversity scheme that is configured for UE #1. The signaling message sent on HS-SCCH #2 in TTI m+3 may also convey various parameters for the transmission sent with transmit diversity in this TTI. UE #1 is not scheduled in TTI in m+4. UE #1 is scheduled with two transmissions for two data streams in TTI m+5. A signaling message for the first data stream is sent on HS-SCCH #3, and a signaling message for the second data stream is sent on HS-SCCH #4. The signaling message sent on HS-SCCH #3 in TTI m+5 may convey various parameters for the transmission sent in this TTI for the first data stream. The signaling message sent on HS-SCCH #4 in TTI m+5 may convey various parameters for the transmission sent in this TTI for the second data stream.

In the example shown in FIG. 3, a predetermined mapping between selected HS-SCCHs and data streams is used to send signaling messages. Any HS-SCCHs may be selected in each TTI, and the signaling message for each data stream is mapped to one of the selected HS-SCCHs based on the predetermined mapping. A given HS-SCCH may carry signaling messages for different data streams in different TTIs. For example, HS-SCCH #3 carries a signaling message for the second data stream in TTI m+1 and a signaling message for the first data stream in TTI m+5.

In general, the channel IDs (or code indices) of the HS-SCCHs may be used to convey any type of signaling information for one data stream in MIMO or non-MIMO operation or for multiple data streams in MIMO operation. For example, the channel IDs may be used to convey all or part of any of the signaling parameters shown in Table 2 or 3 for one or multiple data streams. The number of information bits that may be conveyed with the channel IDs is dependent on the number of HS-SCCHs available to send signaling information. For example, two bits of signaling information may be conveyed if four HS-SCCHs are available. These two bits may be used for various types of signaling information for one or multiple data streams, as described below.

The channel IDs of the HS-SCCHs may be used to convey channelization code information for the HS-PDSCHs. The 120 possible channelization code sets may be divided into multiple disjoint or partially overlapping groups so that each channelization code set is placed in at least one group. Each group may be associated with a different channel ID or HS-SCCH. A channelization code set may then be selected from one of the groups and sent on the associated HS-SCCH. For example, the 120 possible channelization code sets may be divided into four groups, with each group containing approximately 30 channelization code sets. A selected channelization code set may then be conveyed by (a) the channel ID associated with the group containing the selected channelization code set and (b) a 5-bit index for this channelization code set within the group. The 5-bit index may be sent on the HS-SCCH.

In HSDPA, a channelization code set contains one or more consecutive channelization codes in the OVSF code tree and is conveyed by a code index for the starting channelization code and the number of channelization codes in the set. There are 15-x possible channelization code sets for a starting channelization code index of x. One or more starting channelization code indices may be associated with each channel ID or HS-SCCH. A selected channelization code set may then be conveyed by (a) the channel ID associated with the starting channelization code index for the selected channelization code set and (b) the number of channelization code in this set, which may be sent on the HS-SCCH. The channel IDs may also be used to convey which direction to count channelization codes in the OVSF code tree, e.g., from 0 to 15 or from 15 down to 0.

The channel IDs may also be used to convey modulation information. Different channel IDs may be associated with different modulation schemes, e.g., QPSK, 16-QAM, etc. A selected modulation scheme may then be conveyed by the associated channel ID.

The channel IDs may also be used to convey transport block size information. All possible transport block sizes may be divided into multiple disjoint or partially overlapping groups so that each transport block size is placed in at least one group. Each group may be associated with a different channel ID of HS-SCCH. A selected transport block size may then be conveyed by (a) the channel ID associated with the group containing the selected transport block size and (b) an index for the selected transport block size within the group, which may be sent on the HS-SCCH.

The channel IDs may also be used to convey HARQ process ID information. All possible HARQ process IDs may be divided into multiple disjoint or partially overlapping groups so that each HARQ process ID is placed in at least one group. Each HARQ process ID group may be associated with a different channel ID. A given HARQ process may then be conveyed by (a) the channel ID associated with the HARQ process ID group containing the selected HARQ process ID and (b) an index for the selected HARQ process ID within the group, which may be sent on the HS-SCCH. For example, channel ID #1 may convey a first HARQ process ID, channel ID #2 may convey a second HARQ process ID, etc.

A group size of one may be used for channelization code set, transport block size, HARQ process ID, etc. A group with a size of one may be mapped to a channel ID. The group may be conveyed by the associated channel ID, and an index into the group would not need to be sent on the HS-SCCH.

The channel IDs may also be used to convey new data indicator and/or redundancy version information. A predetermined sequence of redundancy versions (e.g., Va, Vb, Vc, Vd, etc.) may be defined (e.g., at call setup). Different transmissions of a transport block may be associated with different channel IDs. For example, channel ID #1 may convey the first transmission (Va) for the transport block, channel ID #2 may convey the second transmission (Vb) for the transport block, etc. The new data indicator is conveyed by sending signaling information on channel ID #1.

For MIMO, the channel IDs of the HS-SCCHs may be used to convey channelization code information for the HS-PDSCHs for multiple data streams. The 120 possible channelization code sets may be divided into multiple disjoint or partially overlapping groups. Different combinations of groups may be defined for multiple data streams, with each combination containing one group for each data stream. Each combination of groups may be associated with a different channel ID of HS-SCCH. In one design, the 120 possible channelization code sets may be divided into two groups #1 and #2, with each group containing approximately 60 channelization code sets. For two data streams, combination #1 may include group #1 and group #1, combination #2 may include group #1 and group #2, combination #3 may include group #2 and group #1, and combination #4 may include group #2 and group #2, for the two to be transmitted data streams, respectively. The first group in the combination may contain the channelization code set for the first data stream, and the second group may contain the channelization code set for the second data stream. For example, combination #3 may be selected if the channelization code set for the first data stream is in group #2 and the channelization code set for the second data stream is in group #1.

In another design, different combinations of starting channelization code indices may be defined for multiple data streams. For example, combination #1 may include code indices 0 and 8, combination #2 may include code indices 2 and 6, combination #3 may include code indices 4 and 7, and combination #4 may include code indices 6 and 10. Combination #2 may be selected if the first data stream has a starting channelization code index of 2 and the second data stream has a starting channelization code index of 6. In yet another design, the multiple data streams have the same starting channelization code index but may have different numbers of channelization codes. In this case, different starting channelization code indices (instead of different combinations of starting channelization code indices) for the multiple data streams may be associated with different channel IDs. In yet another design, the multiple data streams have the same channelization code set. The description for conveying channelization code information for one data stream may then be applicable for multiple data streams.

The channel IDs may also be used to convey modulation information for multiple data streams. Different channel IDs may be associated with different combinations of modulation schemes for the multiple data streams. The combinations may be defined such that the modulation scheme for each data stream has the same or lower order than the order of the modulation scheme for a prior data stream. As an example for two data streams, combination #1 may include 16-QAM and 16-QAM, combination #2 may include 16-QAM and QPSK, and combination #3 may include QPSK and QPSK. Combination #2 may be selected if 16-QAM is used for the first data stream and QPSK is used for the second data stream. More combinations may be defined if higher order modulation schemes are supported and/or if more than two data streams are sent. A selected combination of modulation schemes may be conveyed by the associated channel ID.

The channel IDs may also be used to convey transport block size information for multiple data streams. All possible transport block sizes may be divided into multiple disjoint or partially overlapping groups. Different combinations of groups may be defined for multiple data streams, with each combination containing one group for each data stream. Each combination of groups may be associated with a different channel ID of HS-SCCH. For example, the possible transport block sizes may be divided into two groups #1 and #2, with each group containing approximately half of the possible transport block sizes. For two data streams, combination #1 may include group #1 and group #1, combination #2 may include group #1 and group #2, combination #3 may include group #2 and group #1, and combination #4 may include group #2 and group #2. The first group in the combination may contain the transport block size for the first data stream, and the second group may contain the transport block size for the second data stream.

The channel IDs may also be used to convey HARQ process ID, new data indicator and/or redundancy version information for multiple data streams. Different combinations may be defined for any of the information and may be associated with different channel IDs.

The channel IDs may also be used to convey information on transmit antennas used to send one or more data streams. A UE may estimate the SINR of each of the T transmit antennas and select one or more transmit antennas for transmission to the UE. A Node B may receive the antenna selection from the UE and may make a final selection of one or more transmit antennas. Different transmit antennas or different combinations of transmit antennas may be associated with different channel IDs. The transmit antenna(s) used for transmission by the Node B may be conveyed by the associated channel ID.

The channel IDs may also be used to convey information on precoding weight matrix or vector used to send one or more data streams. For CLTD, four precoding weight vectors may be associated with four channel IDs. A selected precoding weight vector may then be conveyed by the associated channel ID. For D-TXAA, two precoding weight matrices may be associated with two channel IDs or two pairs of channel IDs. A selected precoding weight matrix may then be conveyed by the associated channel ID. Precoding weight matrices and vectors for other spatial mapping schemes may also be associated with channel IDs and convey by the channel IDs.

The channel IDs may also be used to convey information on receive antennas to use for data reception. Different combinations of receive antennas may be associated with different channel IDs. The combination of receive antennas to use for data reception may be conveyed by the associated channel ID. As example for two receive antennas, combination #1 may indicate use of both receive antennas, combination #2 may indicate use of a primary receive antenna, etc.

The channel IDs may also be used to convey scheduling information for a UE. For example, channel ID #1 may indicate continued operation, channel ID #2 may indicate that the UE will not be scheduled for a first predetermined amount of time (e.g., 100 ms), channel ID #3 may indicate that the UE will not be scheduled for a second predetermined amount of time (e.g., 50 ms), etc. The UE may use the scheduling information to go to sleep during the time that it will not be scheduled.

In general, the channel IDs of the HS-SCCHs may be used to convey any signaling information. Each channel ID may be associated with certain signaling information, certain interpretation of a signaling parameter, etc. The interpretation of the channel IDs or the information associated with the channel IDs may be defined a priori by specifications or may be determined at the start of a call (e.g., during call setup) and/or during the call and may be exchanged between a Node B and a UE via higher layer signaling messages (e.g., Radio Resource Control (RRC) messages in UMTS). The interpretation may be dependent on whether MIMO or non-MIMO operation is being employed, the characteristics of the data transmission to the UE, etc. The interpretation should be relatively static or should change slowly in order to avoid excessive exchanges of higher layer signaling messages to effectuate changes in the interpretation. Default interpretation of the channel IDs may also be provisioned at the UE and used until it is changed.

For clarity, the techniques have been specifically described for HSDPA in UMTS. In HSDPA, multiple signaling channels (or HS-SCCHs) are defined with multiple channelization codes and used to send signaling information. The techniques may also be used for other communication systems in which multiple signaling channels are defined with other system resources. For example, the multiple signaling channels may be defined by (a) different time slots in a system using TDMA, (b) different sets of subcarriers in a system using FDMA, orthogonal frequency division multiple access (OFDMA), or single-carrier frequency division multiple access (SC-FDMA), (c) different sets of subcarriers in different symbol periods, etc. The techniques may also be used for sending signaling information on the downlink as well as uplink.

FIG. 8 shows a process 800 for sending signaling and data. Process 800 may be performed by a Node B for downlink transmission (as described below) or by a UE for uplink transmission (not described below).

A Node B may communicate with a UE to associate different signaling information, different signaling parameter values, or different interpretations of signaling parameter values with a plurality of signaling channels (block 812). The Node B may select at least one signaling channel from among the plurality of signaling channels based on first signaling information (block 814). The Node B may send second signaling information on the at least one selected signaling channel to convey the first and second signaling information (block 816). The Node B may send at least one data stream on at least one data channel in accordance with the first and second signaling information (block 818).

For blocks 814 and 816, the Node B may select at least two signaling channels from among the plurality of signaling channels and send at least two signaling messages for at least two data streams on the at least two signaling channels. The Node B may also select at least two signaling channels from among the plurality of signaling channels, map at least two signaling messages for at least two data streams to the at least two signaling channels, and send the at least two signaling messages on the at least two signaling channels, e.g., as shown in FIG. 7. In both cases, the first signaling information may convey which signaling message is applicable to each data stream. The first signaling information may be based on a predetermined mapping between signaling channels and data streams, e.g., the n-th (available or selected) signaling channel may carry signaling information for the n-th data stream.

The first signaling information may also convey various types of information. The first signaling information may comprise information on at least one channelization code used for data transmission. For example, the plurality of signaling channels may be associated with a plurality of groups of channelization codes, one signaling channel for each group of channelization codes. A signaling channel may then be selected based on the group containing the at least one channelization code used for data transmission. The first signaling information may also comprise information on at least one modulation scheme used for data transmission. For example, the plurality of signaling channels may be associated with a plurality of combinations of modulation schemes for multiple data streams, one signaling channel for each combination of modulation schemes. The first signaling information may also comprise information on at least one transport block size used for data transmission, information on precoding weights used for data transmission, information on at least one transmit antenna used for data transmission, information on at least one receive antenna to use for data reception, HARQ information (e.g., new data indicator and/or redundancy version), scheduling information, etc. The first signaling information may be for one data stream or multiple data streams. The second signaling information may comprise any of the information in Table 2 or 3 and/or other signaling information.

The selection of the at least one signaling channel in block 814 may also be dependent on the signaling information being sent. In one design, the at least one signaling channel may be selected based on the first signaling information when enabled by third signaling information, and the second and third signaling information may be sent on the selected signaling channel(s) to convey the first, second, and third signaling information. The at least one signaling channel may be selected based on the first signaling information when the third signaling information is within a set of values and may be selected without regard to the first signaling information when the third signaling information is not within the set of values. For example, the second signaling information may be for a channelization code set, and the third signaling information may be for a modulation scheme. The at least one signaling channel may be selected based on the channelization code set if a modulation scheme higher than QPSK is used, and may be selected without regard to the channelization code set if QPSK is used.

The plurality of signaling channels may correspond to a plurality of channelization codes, a plurality of time slots, a plurality of sets of subcarriers, or a plurality of power settings/levels used for sending signaling information. For example, the plurality of signaling channels may correspond to the HS-SCCHs used for HSDPA in UMTS. As another example, a power level of 20 dBm may corresponding to one signaling channel and one interpretation of the transmitted signaling information, a power level of 30 dBm may corresponding to another signaling channel and another interpretation of the transmitted signaling information, etc.

FIG. 9 shows a process 900 for receiving signaling and data. Process 900 may be performed by a UE for downlink transmission (as described below) or by a Node B for uplink transmission (not described below).

A UE may communicate with a Node B to associate different signaling information or different signaling parameter values or different signaling parameter interpretations with a plurality of signaling channels (block 912). The UE may receive at least one signaling channel from among the plurality of signaling channels in a given TTI (block 914). The UE may obtain first signaling information based on the at least one signaling channel (block 916). The first information may be any of the information described above. The UE may decode the at least one signaling channel to obtain second signaling information sent on the at least one signaling channel (block 918). The UE may then process at least one data channel in accordance with the first and second signaling information to recover at least one data stream (block 920).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:
1. An apparatus comprising:
a processor to:
select at least one signaling channel from a plurality of signaling channels based on first signaling information associated with a data stream of a plurality of data streams, wherein the first signaling information includes information related to precoding weights used for data transmission; and
send second signaling information associated with the data stream on the at least one selected signaling channel to convey the second signaling information via the at least one selected signaling channel and to convey the first signaling information via a channel identifier (ID) of the at least one selected signaling channel; and a memory coupled to the processor.

2. The apparatus of claim 1, wherein the processor selects the at least one signaling channel from the plurality of signaling channels based on the first signaling information when enabled by third signaling information, and sends the second and third signaling information on the at least one selected signaling channel to convey the first, second, and third signaling information.

3. The apparatus of claim 2, wherein the processor selects the at least one signaling channel based on the first signaling information when the third signaling information is within a set of values, and selects the at least one signaling channel without regard to the first signaling information when the third signaling information is not within the set of values.

4. The apparatus of claim 2, wherein the second signaling information comprises information related to at least one channelization code, and wherein the third signaling information comprises information related to at least one modulation scheme.

5. The apparatus of claim 1, wherein the processor sends at least one data stream on at least one data channel in accordance with the first and second signaling information.

6. The apparatus of claim 1, wherein the processor selects at least two signaling channels from the plurality of signaling channels, and sends at least two signaling messages for at least two data streams on the at least two selected signaling channels, wherein the first signaling information conveys which signaling message is applicable to each data stream.

7. The apparatus of claim 1, wherein the processor selects at least two signaling channels from the plurality of signaling channels, maps at least two signaling messages for at least two data streams to the at least two selected signaling channels, and sends the at least two signaling messages on the at least two signaling channels, wherein the first signaling information conveys which signaling message is applicable to each data stream.

8. The apparatus of claim 1, wherein the first signaling information further comprises information related to at least one channelization code used for data transmission.

9. The apparatus of claim 8, wherein the plurality of signaling channels are associated with a plurality of groups of channelization codes, one signaling channel for each group of channelization codes, and wherein the processor selects a signaling channel from the plurality of signaling channels based on a group containing the at least one channelization code used for data transmission.

10. The apparatus of claim 1, wherein the first signaling information further comprises information related to at least one modulation scheme used for data transmission.

11. The apparatus of claim 10, wherein the plurality of signaling channels is associated with a plurality of combinations of modulation schemes for multiple data streams, one signaling channel for each combination of modulation schemes.

12. The apparatus of claim 1, wherein the first signaling information further comprises information related to at least one transport block size used for data transmission.

13. The apparatus of claim 1, wherein the first signaling information further comprises information related to at least one transmit antenna used for data transmission.

14. The apparatus of claim 1, wherein the first signaling information further comprises information related to at least one receive antenna to use for data reception.

15. The apparatus of claim 1, wherein the first signaling information further comprises hybrid automatic retransmission (HARQ) process ID information.

16. The apparatus of claim 1, wherein the first signaling Information further comprises redundancy version information.

17. The apparatus of claim 1, wherein the first signaling information further comprises an indication of new transmission or retransmission of a data block.

18. The apparatus of claim 1, wherein the first signaling information further comprises scheduling information.

19. The apparatus of claim 1, wherein the processor communicates with user equipment (UE) to associate different signaling information with the plurality of signaling channels.

20. The apparatus of claim 1, wherein the processor communicates with user equipment (UE) to associate a plurality of signaling parameter values with the plurality of signaling channels.

21. The apparatus of claim 1, wherein the processor communicates with user equipment (UE) to associate a plurality of interpretations of signaling parameter values with the plurality of signaling channels.

22. The apparatus of claim 1, wherein the plurality of signaling channels correspond to a plurality of channelization codes used for sending signaling information.

23. The apparatus of claim 1, wherein the plurality of signaling channels correspond to a plurality of time slots used for sending signaling information.

24. The apparatus of claim 1, wherein the plurality of signaling channels correspond to a plurality of sets of subcarriers used for sending signaling information.

25. The apparatus of claim 1, wherein the plurality of signaling channels correspond to a plurality of predetermined power settings used for sending signaling information.

26. The apparatus of claim 1, wherein the plurality of signaling channels correspond to a plurality of Shared Control Channels for High Speed Downlink Shared Channel (HS-SCCHs), wherein the plurality of data streams is conveyed via a plurality of High Speed Physical Downlink Shared Channels (HS-PDSCHs), wherein the plurality of HS-SCCHs includes four HS-SCCHs, and wherein the plurality of HS-PDSCHs includes fifteen HS-PDSCHs.

27. A method comprising:
selecting at least one signaling channel from a plurality of signaling channels based on first signaling information associated with a data stream of a plurality of data streams, wherein the first signaling information includes information related to precoding weights used for data transmission; and sending second signaling information associated with the data stream on the at least one selected signaling channel to convey the second signaling information via the at least one selected signaling channel and to convey the first signaling information via a channel identifier (ID) of the at least one selected signaling channel.

28. The method of claim 27, further comprising:
sending at least one data stream on at least one data channel in accordance with the first and second signaling information.

29. The method of claim 27, wherein the selecting of the at least one signaling channel comprises:
selecting at least two signaling channels from the plurality of signaling channels; and
mapping at least two signaling messages for at least two data streams to the at least two signaling channels, wherein the sending of the second signaling information comprises:
sending the at least two signaling messages on the at least two signaling channels, wherein the first signaling information conveys which signaling message is applicable to each data stream.

30. The method of claim 27, wherein the plurality of signaling channels is associated with a plurality of groups of channelization codes, one signaling channel for each group of channelization codes, and wherein the selecting of the at least one signaling channel comprises:
selecting a signaling channel from the plurality of signaling channels based on a group containing at least one channelization code used for data transmission.

31. The method of claim 27, further comprising:
communicating with user equipment (UE) to associate different signaling information or a plurality of signaling parameter values with the plurality of signaling channels.

32. The method of claim 27, wherein the channel ID conveys channelization code information.

33. The method of claim 27, wherein the channel ID conveys modulation scheme information.

34. The method of claim 27, wherein the channel ID conveys transport block size information.

35. The method of claim 27, wherein the channel ID conveys a new data indicator, redundancy version information, or any combination thereof.

36. The method of claim 27, wherein the channel ID conveys information regarding one or more transmit antennas used to transmit at least one of the first signaling information and the second signaling information.

37. The method of claim 27, wherein the channel ID conveys information regarding one or more receive antennas used to receive at least one of the first signaling information and the second signaling information.

38. The method of claim 27, wherein the channel ID conveys scheduling information for user equipment.

39. The method of claim 38, wherein the scheduling information indicates that the user equipment will not be scheduled for a predetermined amount of time and wherein the user equipment uses the scheduling information to sleep for the predetermined amount of time.

40. The method of claim 27, further comprising sending, during each transmission time interval (TTI), signaling information via signaling channels and data streams via data channels, wherein a number of signaling channels used during a particular TTI is equal to a number of data streams sent during the particular TTI.

41. The method of claim 40, wherein the signaling channels used during the particular TTI are mapped to the data streams sent during the particular TTI in accordance with a mapping that indicates that a lowest code index among the signaling channels is to be assigned to a first of the data streams.

42. An apparatus comprising:
means for selecting at least one signaling channel from a plurality of signaling channels based on first signaling information associated with a data stream of a plurality of data streams, wherein the first signaling information includes information related to precoding weights used for data transmission; and
means for sending second signaling information associated with the data stream on the at least one selected signaling channel to convey the second signaling information via the at least one selected signaling channel and to convey the first signaling information via a channel identifier (ID) of the at least one selected signaling channel.

43. The apparatus of claim 42, further comprising:
means for sending at least one data stream on at least one data channel in accordance with the first and second signaling information.

44. The apparatus of claim 42, wherein the plurality of signaling channels is associated with a plurality of groups of channelization codes, one signaling channel for each group of channelization codes, and wherein the means for selecting the at least one signaling channel comprises:
means for selecting a signaling channel from the plurality of signaling channels based on a group containing at least one channelization code used for data transmission.

45. A non-transitory processor readable medium for storing instructions to:
select at least one signaling channel from a plurality of signaling channels based on first signaling information associated with a data stream of a plurality of data streams, wherein the first signaling information includes information related to precoding weights used for data transmission; and
send second signaling information associated with the data stream on the at least one selected signaling channel to convey the second signaling information via the at least one selected signaling channel and to convey the first signaling information via a channel identifier (ID) of the at least one selected signaling channel.

46. The non-transitory processor readable medium of claim 45, further comprising instructions to:
send at least one data stream on at least one data channel in accordance with the first and second signaling information.

47. An apparatus comprising:
a processor to:
receive at least one signaling channel from a plurality of signaling channels;
obtain first signaling information associated with a data stream of a plurality of data streams based on the at least one signaling channel, wherein the first signaling information includes information related to precoding weights used for data transmission; and
decode the at least one signaling channel to obtain second signaling information associated with the data stream sent on the at least one signaling channel,
wherein the second signaling information is sent on the at least one selected signaling channel to convey the second signaling information via the at least one selected signaling channel and to convey the first signaling information via a channel identifier (ID) of the at least one selected signaling channel; and
a memory coupled to the processor.

48. The apparatus of claim 47, wherein the processor processes at least one data channel in accordance with the first and second signaling information to recover at least one data stream.

49. The apparatus of claim 47, wherein the processor communicates with a Node B to associate at least one signaling parameter value with the at least one signaling channel.

50. A method comprising:
monitoring at least one signaling channel from a plurality of signaling channels;
obtaining first signaling information associated with a data stream of a plurality of data streams based on the at least one signaling channel, wherein the first signaling information includes information related to precoding weights used for data transmission; and decoding the at least one signaling channel to obtain second signaling information associated with the data stream sent on the at least one signaling channel, wherein the second signaling information is sent on the at least one selected signaling channel to convey the second signaling information via the at least one selected signaling channel and to convey the first signaling information via a channel identifier (ID) of the at least one selected signaling channel.

51. The method of claim 50, further comprising:

processing at least one data channel in accordance with the first and second signaling information to recover at least one data stream.

52. The method of claim 50, further comprising:

communicating with a Node B to associate at least one signaling parameter value with the at least one signaling channel.

53. An apparatus comprising:

means for monitoring at least one signaling channel from a plurality of signaling channels;

means for obtaining first signaling information associated with a data stream of a plurality of data streams based on the at least one signaling channel, wherein the first signaling information includes information related to precoding weights used for data transmission; and means for decoding the at least one signaling channel to obtain second signaling information associated with the data stream sent on the at least one signaling channel, wherein the second signaling information is sent on the at least one selected signaling channel to convey the second signaling information via the at least one selected signaling channel and to convey the first signaling information via a channel identifier (ID) of the at least one selected signaling channel.

54. The apparatus of claim 53, further comprising:

means for processing at least one data channel in accordance with the first and second signaling information to recover at least one data stream.

* * * * *